(12) United States Patent
Nakahata et al.

(10) Patent No.: US 11,990,271 B2
(45) Date of Patent: May 21, 2024

(54) SOFT MAGNETIC RIBBON FOR MAGNETIC CORE, MAGNETIC CORE, COIL UNIT, AND WIRELESS POWER TRANSMISSION UNIT

(71) Applicant: TDK CORPORATION, Tokyo (JP)

(72) Inventors: Isao Nakahata, Tokyo (JP); Mitsuhiro Matsuhashi, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 15/924,847

(22) Filed: Mar. 19, 2018

(65) Prior Publication Data

US 2018/0286550 A1    Oct. 4, 2018

(30) Foreign Application Priority Data

Mar. 28, 2017  (JP) .................. 2017-063161
Jan. 16, 2018  (JP) .................. 2018-005105

(51) Int. Cl.
| | |
|---|---|
| *H01F 3/04* | (2006.01) |
| *H01F 1/14* | (2006.01) |
| *H01F 3/10* | (2006.01) |
| *H01F 27/25* | (2006.01) |
| *H01F 38/14* | (2006.01) |
| *H01F 41/02* | (2006.01) |
| *H02J 50/10* | (2016.01) |

(52) U.S. Cl.
CPC .................. *H01F 3/04* (2013.01); *H01F 1/14* (2013.01); *H01F 3/10* (2013.01); *H01F 27/25* (2013.01); *H01F 38/14* (2013.01); *H01F 41/0226* (2013.01); *H02J 50/10* (2016.02); *H01F 41/0213* (2013.01)

(58) Field of Classification Search
CPC .. H01F 2003/106; H01F 27/365; H01F 38/14; H01F 10/08; H01F 7/0215; H02J 50/10; H02J 7/025; H02J 17/00; H04B 5/0025; H04B 5/0031; H04B 5/0037; H05K 9/0081; H01Q 1/2208
See application file for complete search history.

(56) References Cited

U.S. PATENT DOCUMENTS

| | | |
|---|---|---|
| 2016/0276079 A1 | 9/2016 | Nishimoto et al. |
| 2016/0345473 A1 | 11/2016 | Lee et al. |
| 2016/0345474 A1* | 11/2016 | Oh ........................ H04B 5/0037 |
| 2017/0365393 A1 | 12/2017 | Kim et al. |

FOREIGN PATENT DOCUMENTS

| | | |
|---|---|---|
| JP | 2009-182062 A | 8/2009 |
| JP | 2011-134959 A | 7/2011 |
| JP | 4836749 B2 | 12/2011 |
| JP | 2012-070557 A | 4/2012 |
| KR | 10-2017-0001158 A | 1/2017 |
| KR | 10-1719915 B1 | 3/2017 |
| WO | 2015/064694 A1 | 5/2015 |

OTHER PUBLICATIONS

Jun. 29, 2021 Translation of Japanese Office Action issued in Japanese Patent Application No. 2018-005105.

* cited by examiner

*Primary Examiner* — Holly Rickman
*Assistant Examiner* — Linda N Chau
(74) *Attorney, Agent, or Firm* — Oliff PLC (57) ABSTRACT

A soft magnetic ribbon for a magnetic core segmented into small pieces includes: an inductance priority region having a first average crack interval; and an eddy current suppression priority region having a second average crack interval, in which the first and second average crack intervals are different from each other.

7 Claims, 4 Drawing Sheets

SOFT MAGNETIC RIBBON FOR MAGNETIC CORE, MAGNETIC CORE, COIL UNIT, AND WIRELESS POWER TRANSMISSION UNIT

BACKGROUND OF THE INVENTION

Field of the Invention

The present invention relates to a soft magnetic ribbon for a magnetic core, a magnetic core, a coil unit and a wireless power transmission unit.

Priority is claimed on Japanese Patent Application No. 2017-063161, filed on Mar. 28, 2017, and Japanese Patent Application No. 2018-005105, filed on Jan. 16, 2018, the content of which is incorporated herein by reference.

Description of Related Art

A technology for transmitting electric power without using a power cord, that is, wireless power transmission technology, is drawing attention. Since wireless power transmission technology can supply electric power from a power-feeding device to a power-receiving device in a non-contact manner, it is expected to be applied to various products such as moving bodies including trains, electric automobiles, and the like, home appliances, electronic devices, wireless communication devices, and toys.

In a device used for wireless power transmission, in order to realize high power transmission efficiency, thinning, weight reduction, and high-power transmission, for example, structures of a conductor member and windings which form a coil included in a coil unit, and structures and materials used as magnetic materials have been investigated (for example, Patent Document 1).

For example, as shown in Patent Document 1, ferrite is often used as a magnetic material. However, in the case of moving bodies such as automobiles or portable devices such as smartphones, since vibration and impact may be applied to the devices, it is desired that the magnetic material have high vibration resistance and high impact resistance, but ferrite is a typical ceramic and is easily broken.

Although it is desired to reduce a thickness and weight in moving bodies such as automobiles or portable devices such as smartphones, they are more easily broken when made thin, and ferrite has a low saturation magnetic flux density, and particularly in devices with high output power, thinning is limited due to a concern of magnetic saturation.

Patent Document 2 discloses a magnetic core for wireless power transmission which is enhanced in impact resistance and not broken due to impact such as dropping. However, the disclosed magnetic core for wireless power transmission is a molded body of a ferrite resin composition, has a low magnetic permeability of 5 to 15, and has a low saturation magnetic flux density due to the use of ferrite. Due to the low magnetic permeability, it is necessary to increase the number of windings of a coil in order to increase inductance. Especially in devices with high output power, copper loss increases significantly and efficiency decreases when the number of turns of the coil increases. Also, since the saturation magnetic flux density is low, a large cross-sectional area of the magnetic core needs to be used in devices with high output power, which is not suitable for miniaturization of devices.

In reducing a thickness of wireless power transmission devices, it is preferable that a magnetic material have a high saturation magnetic flux density so that it is not magnetically saturated even if the magnetic core is made thin. A metal-based soft magnetic material is known as a soft magnetic material having a high saturation magnetic flux density, but such a metal-based soft magnetic material has very low electrical resistivity, and when it is used as a magnetic core for wireless power transmission device, there is a problem in that loss due to eddy current is very large and transmission efficiency decreases.

As a method for lowering an influence of eddy current loss and improving transmission efficiency, Patent Document 3 discloses a magnetic core using a soft magnetic ribbon segmented into a plurality of small pieces. In addition, Patent Document 4 discloses a structure for reducing eddy current loss, suppressing reduction of magnetic permeability as much as possible, and improving scattering of small pieces, which is a problem in segmentation into small pieces.

In addition, Patent Document 3 discloses a magnetic sheet characterized by being segmented such that a magnetic material piece having an area of 0.01 $mm^2$ or more and 25 $mm^2$ or less is positioned in a portion corresponding to a central portion of a coil, and shows that there is a certain effect in decreasing eddy current even with the segmentation near the center portion and a Q value of the coil improves.

The magnetic cores disclosed in Patent Documents 3 and 4 are extremely thin because of the large saturation magnetic flux density of the magnetic material, have ameliorated eddy current loss which was a problem in metal-based soft magnetic materials, and thus are suitable in thinning, weight reduction, and high transmission efficiency. However, since a thickness of the magnetic material layer is extremely thin at 30 μm and magnetic saturation occurs in high-power transmission, there is a limit to the power that can be transmitted.

Figure 1A:
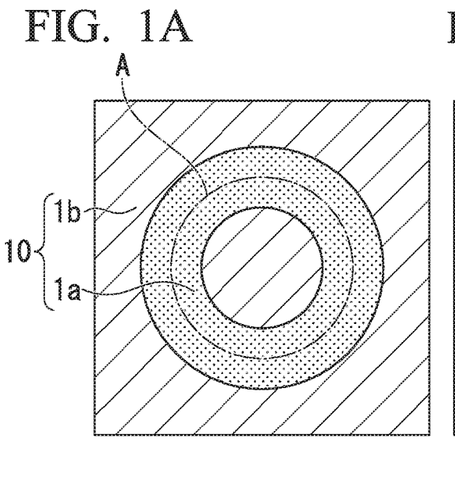
FIG. 1A is a plan view of a soft magnetic ribbon for a magnetic core according to one embodiment of the present invention.
Figure 1B:
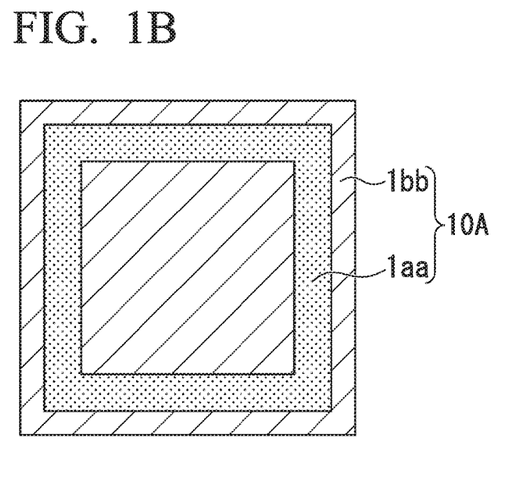
FIG. 1B is a plan view of a soft magnetic ribbon for a magnetic core according to another embodiment of the present invention.

In the case of being segmented such that the magnetic material piece is positioned in the portion corresponding to the central portion of the coil as in Patent Document 3, although it is possible to suppress eddy current loss due to the change in magnetic flux at an inside area of the coil, most eddy currents are not suppressed, which is insufficient. In addition, when the entire surface is segmented as shown in FIGS. 1A and 1B, since inductance in a case of being used as a core of the coil decreases, the coil needs to have a large number of turns to obtain a desired inductance, and thereby copper loss increases and power transmission efficiency decreases.

Patent Document 5 discloses a magnetic sheet for magnetic shielding which has two or more regions having different crack sizes (or segmented sizes) in the same magnetic sheet surface.

The magnetic sheet of Patent Document 5 is used as a magnetic shield for preventing a magnetic flux that occurs when wireless power feeding (WPC), near field communication (NFC), or the like is performed in a mobile device from reaching a battery installed near the coil. In order to obtain a high magnetic shielding effect, it is preferable to use a magnetic sheet having a large real part of complex magnetic permeability and a small imaginary part thereof at a frequency to be used. Conventionally two types of magnetic sheets having different magnetic permeabilities have been used due to different frequency bands used for WPC and NFC, whereas, in Patent Document 5, by changing a crack size of the metal ribbon or ferrite, regions having different magnetic permeabilities suitable for each frequency are formed in the same plane, and by using this, a volume occupied by the magnetic sheet in a mobile device is reduced.

PATENT DOCUMENTS

[Patent Document 1] Japanese Unexamined Patent Application, First Publication No. 2012-70557
[Patent Document 2] PCT International Publication No. WO 2015/064694
[Patent Document 3] Japanese Patent Publication No. 4836749
[Patent Document 4] Japanese Unexamined Patent Application, First Publication No. 2011-134959
[Patent Document 5] U.S. Patent Application Publication No. 2016/0345473

SUMMARY OF THE INVENTION

However, a magnetic sheet for magnetic shielding disclosed in Patent Document 5 has been made for the above-described purpose, and when considering application as a magnetic core for wireless power supply, a reduction of eddy current loss and maintenance of high inductance cannot be achieved at the same time.

In order to solve such a problem, in a soft magnetic ribbon constituting a magnetic core, while a crack size (segmented size) is decreased to suppress the eddy current in a region in which a change in magnetic flux is large, the crack size is increased to maintain high inductance in a region in which the change in magnetic flux is small as compared with the above-described region, that is, the present inventors have conceived of achieving both a reduction of eddy current loss and maintenance of high inductance by providing two types of regions having different crack sizes in one soft magnetic ribbon and completed the present invention.

The present invention has been made in view of the above-described problems, and an objective of the present invention is to provide a soft magnetic ribbon for a magnetic core, a magnetic core, a coil unit, and a wireless power transmission unit in which both of a reduction of eddy current loss and maintenance of high inductance are achieved at the same time.

In order to solve the above problem, the following methods are provided.

(1) A soft magnetic ribbon for a magnetic core according to one aspect of the present invention segmented into small pieces includes: an inductance priority region having a first average crack interval; and an eddy current suppression priority region having a second average crack interval, in which the first and second average crack intervals are different from each other.

(2) In the above-described aspect, the inductance priority region may be a coil disposed region configured such that a coil to is to be disposed thereon, the eddy current suppression priority region may be a coil non-disposed region configured such that no coil is to be disposed thereon, and the first average crack interval may be larger than the second average crack interval.

(3) In the above-described aspect, the soft magnetic ribbon may further comprise a region having a third average crack interval smaller than the second average crack interval in the vicinity of a boundary between the coil disposed region and the coil non-disposed region.

(4) A magnetic core according to one aspect of the present invention includes a soft magnetic ribbon for a magnetic core according to the above-described aspect.

(5) A coil unit according to one aspect of the present invention includes a magnetic core according to the above-described aspect and a coil disposed on the magnetic core.

(6) A wireless power transmission unit according to one aspect of the present invention includes a coil unit according to the above-described aspect.

According to the soft magnetic ribbon for a magnetic core, the magnetic core, the coil unit, and the wireless power transmission unit of the present invention, it is possible to provide a soft magnetic ribbon for a magnetic core, a magnetic core, a coil unit, and a wireless power transmission unit in which both of a reduction of eddy current loss and maintenance of high inductance are achieved at the same time.

DETAILED DESCRIPTION OF THE INVENTION

Hereinafter, the present embodiment will be described in detail with reference to the drawings as appropriate. In the drawings used in the following description, there are cases in which characteristic portions are appropriately enlarged for convenience of illustration so that characteristics of the present invention can be easily understood, and dimensional ratios of respective constituent elements may be different from actual ones. Materials, dimensions, and the like illustrated in the following description are merely examples, and the present invention is not limited thereto and can be implemented with appropriate modifications within a range in which the effect of the present invention is achieved.

[Soft Magnetic Ribbon for Magnetic Core]

FIG. 1A is a plan view of a soft magnetic ribbon for a magnetic core according to one embodiment of the present invention, and FIG. 1B is a plan view of a soft magnetic ribbon for a magnetic core according to another embodiment of the present invention.

A soft magnetic ribbon 10 for a magnetic core shown in FIG. 1A is a soft magnetic ribbon for a magnetic core segmented into small pieces, and the soft magnetic ribbon for a magnetic core includes an inductance priority region 1a having a first average crack interval and an eddy current suppression priority region 1b having a second average crack interval, in which the first and second average crack intervals are different from each other.

A soft magnetic ribbon 10A for a magnetic core shown in FIG. 1B is a soft magnetic ribbon for a magnetic core segmented into small pieces, and the soft magnetic ribbon for a magnetic core includes an inductance priority region 1aa having a first average crack interval and an eddy current suppression priority region 1bb having a second average crack interval, in which the first and second average crack intervals are different from each other.

Here, in the present specification, the "average crack interval" refers to a value obtained by dividing the number of cracks intersecting a line segment by a length of the line segment when the line segment is drawn in a cracked (segmentation, segmented into small pieces) region.

With reference to a specific case shown in FIG. 2, calculation of the "average crack interval" will be described. Numbers in FIG. 2 indicate numbers obtained by sequentially counting intersections of cracks and line segments.

Figure 2:
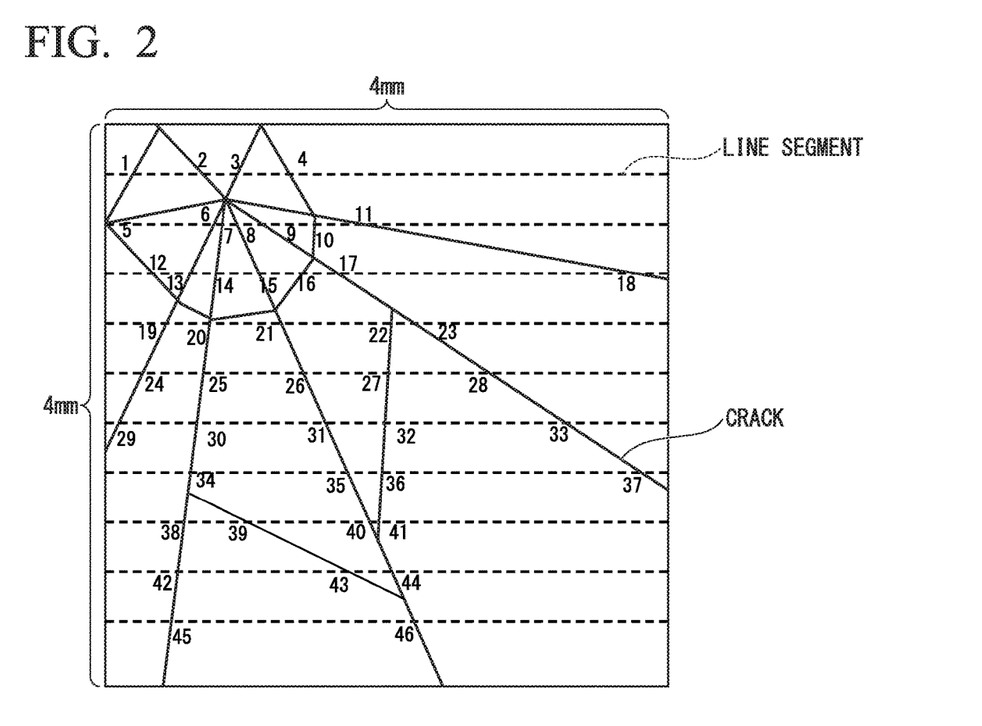
FIG. 2 is a view describing how to calculate an "average crack interval."

The example shown in FIG. 2 is a soft magnetic ribbon for a square magnetic core of 4 mm×4 mm, and cracks are generated by performing segmentation processing. In the figure, cracks are represented by solid lines and line segments are represented by dotted lines.

The line segments extend in one direction (horizontal in the figure) of the soft magnetic ribbon for the square magnetic core, and ten line segments parallel to each other are arranged at regular intervals in a direction orthogonal to the one direction (vertical in the figure). At this time, the number of cracks intersecting the line segments is measured and is referred to as a total number of cracks intersecting the line segments, and a total length of the line segments divided by the total number is referred to as an average crack interval. This can be expressed by Expression (1).

Average crack interval [mm]=(total length of line segments)/(total number of cracks intersecting line segments)    (1)

When Expression (1) is applied to the example shown in FIG. 2, since the total number of cracks intersecting the line segments is 46 and the total length of the line segments is 40 mm, the average crack interval is 40/46 [mm], that is, about 0.87 mm.

Since the average crack interval varies depending on selected areas, it is preferable to calculate it in a plurality of regions and then average them.

Also, it is preferable to predetermine how to obtain selection regions.

For example, in the case of the soft magnetic ribbon 10 for a magnetic core shown in FIG. 1A, when the average crack interval of the inductance priority region 1a is calculated, a region including a center line A of a donut-shaped region can be selected as the region to be selected.

Although segmentation is performed for suppressing an eddy current in the present embodiment, the segmentation decreases relative magnetic permeability of a soft magnetic ribbon for a magnetic core and leads to a decrease in inductance. Therefore, the present inventors achieved both a reduction of eddy current loss and suppression of a decrease in inductance (maintenance of high inductance) in a soft magnetic ribbon for a magnetic core by providing a region with a large degree of segmentation and a region with a small degree of segmentation in one soft magnetic ribbon for a magnetic core through a configuration in which a region in which a large eddy current is generated is sufficiently segmented to suppress the eddy current and a region in which the eddy current is not largely generated is not segmented as much so that inductance is not decreased.

The inductance priority region is a coil disposed region configured such that a coil to is to be disposed thereon, the eddy current suppression priority region is a coil non-disposed region configured such that no coil is to be disposed thereon, and the first average crack interval is preferably larger than the second average crack interval. More preferably, the first average crack interval is 50 times the second crack interval or more. In this way, the eddy current loss can be further reduced.

In a coil unit used for wireless power transmission device, although a coil is disposed on one surface of the soft magnetic ribbon for a magnetic core, since a change in magnetic flux density in a direction perpendicular to a coil face is small in the coil disposed region on which the coil is disposed, an eddy current generated in the coil face is not large. In contrast, in the coil non-disposed region on which no coil is disposed, since there is no cancellation of components of the magnetic flux in the direction perpendicular to the coil face, the change in magnetic flux density is large as compared with that in the coil disposed region, and thus the eddy current generated in the coil face is also large. Therefore, it is preferable that priority be given to suppression of the eddy current in the coil non-disposed region, and that priority be given to decrease of the inductance over suppression of the eddy current in the coil disposed region.

Therefore, it is preferable that the coil disposed region be not subjected to much segmentation processing so as to make the average crack interval (second average crack interval) large, and that the coil non-disposed region be subjected to sufficient segmentation processing so as to make the average crack interval (first average crack interval) small.

Here, in this specification, the term "coil disposed region" refers to a region in which a coil is projected in plan view from a coil side when the coil is placed on the soft magnetic ribbon for a magnetic core, and other regions are referred to as "coil non-disposed regions."

It is preferable that the soft magnetic ribbon for a magnetic core further have a region having a third average crack interval smaller than the second average crack interval in the vicinity of a boundary between the coil disposed region and the coil non-disposed region. For example, when the coil disposed region has a donut shape, as the vicinity of the boundary between the coil disposed region and the coil non-disposed region, there are regions close to an inner peripheral edge or an outer peripheral edge of the coil disposed region (these may hereinafter be referred to as "inner peripheral edge vicinity region" or "outer peripheral edge vicinity region" in some cases). More preferably, the third average crack interval is 0.5 times the second crack interval or less.

Since a change in magnetic flux density is large at the boundary between the coil disposed region and the coil non-disposed region, it is preferable to more sufficiently perform the segmentation processing in the vicinity of the boundary region for suppressing the eddy current. For example, when the coil disposed region has a donut shape, it is preferable to more sufficiently perform the segmentation processing on the inner peripheral edge vicinity region or the outer peripheral edge vicinity region, which is a region in which a magnetic flux enters the magnetic core. Both the inner peripheral edge vicinity region and the outer peripheral edge vicinity region include a portion of the coil disposed region and a portion of the coil non-disposed region.

Here, the "vicinity" in the "vicinity of the boundary" is determined in consideration of compatibility between a reduction of eddy current loss and maintenance of high inductance on the basis of a size of the soft magnetic ribbon for a magnetic core or the coil, or the like, and is not limited to a specific numerical range. As a guide, for example, in the case of a planar spiral coil, it may be a region of about 10% or less of a coil diameter (outer diameter) inside and outside the inner peripheral edge, or a region of about 10% or less of the coil diameter inside and outside the outer peripheral edge. For example, when the outer diameter of the coil is 130 mm, it is about ±13 mm from the inner peripheral edge and the outer peripheral edge of the coil.

The present embodiment is an idea for suppressing reduction in inductance as a whole in such a manner that, since the eddy current increases at a portion in which a change in magnetic flux is large, the segmentation processing is sufficiently applied thereto to suppress the increase of the eddy current, whereas, since the eddy current is small at a portion in which the change in magnetic flux is small as compared with the above-described portion, the segmentation processing is not applied thereto as much (including a case in which the segmentation is not applied at all) to avoid a reduction in inductance due to the segmentation.

Since there are two or more magnitudes of the change in magnetic flux on the soft magnetic ribbon for a magnetic core, regions having more types of average crack intervals than described above may be provided, or a large number of regions with substantially continuous variation of average crack intervals may be provided. Alternatively, the change in magnetic flux is predicted by a simulation, and then regions having different average crack intervals according to the magnitude of the change may be provided.

As the soft magnetic ribbon for a magnetic core, a known material can be used, and for example, a magnetic alloy such as an amorphous alloy, a nanocrystalline alloy, permalloy, or the like can be used. Examples of an amorphous alloy material include an Fe-based amorphous soft magnetic material, a Co-based amorphous soft magnetic material, and the like, and examples of a nanocrystalline alloy material include an Fe-based nanocrystalline soft magnetic material, and the like.

[Method of Manufacturing Soft Magnetic Ribbon for Magnetic Core]

As a method of manufacturing the soft magnetic ribbon for a magnetic core of the present embodiment, a known method of segmentation processing, that is, a method of segmentation by applying an external force can be used.

As a method of segmentation by applying an external force, for example, known methods include a method of pushing and segmenting with a die, a method of bending through a mill roll, a method of providing a predetermined concavo-convex pattern on the die or the roll, and the like.

Using these methods, in order to provide two types or more of regions having different average crack intervals in one soft magnetic ribbon for a magnetic core, pattern media (paper template, mask, and the like) corresponding to respective regional patterns may be used so that external forces applied to each region are different. Also, the concavo-convex pattern provided on a surface of the die or the roll may be a pattern corresponding to the pattern of the region.

[Magnetic Core]

Figure 3:
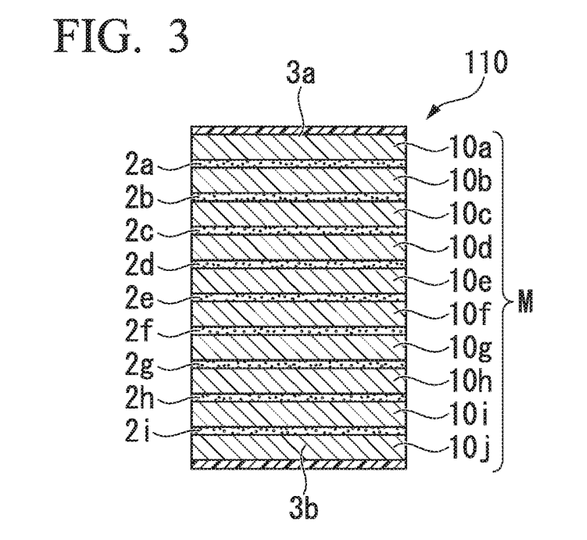
FIG. 3 is a schematic cross-sectional view of a magnetic core according to one embodiment of the present invention.

FIG. 3 is a schematic cross-sectional view of a magnetic core according to one embodiment of the present invention.

A magnetic core 110 shown in FIG. 3 includes a laminate M having: a plurality of soft magnetic ribbons 10a to 10j for a magnetic core segmented into small pieces; and adhesive layers 2a to 2i provided between adjacent soft magnetic ribbons, and at least one among the ten soft magnetic ribbons for a magnetic core is the soft magnetic ribbon for a magnetic core of the above-described embodiment.

In addition, the magnetic core 110 shown in FIG. 3 includes protective films 3a and 3b respectively provided on an upper surface and a lower surface of the laminate M.

Similarly to a typical magnetic core, the magnetic core of the present embodiment includes soft magnetic ribbons for a magnetic core and adhesive layers as main members, but other constituent elements may be included within a range of achieving an effect of the present invention.

Since the adhesive layer is included, falling off of small pieces after the segmentation can be suppressed.

As the adhesive layer, a known adhesive layer can be used, and a surface of polyethylene terephthalate (PET) film base material coated with an adhesive made of an acrylic adhesive, a silicone resin, a butadiene resin or the like, a hot melt or the like can be exemplified. In addition to the PET film, resin films such as a polyimide film, a polyester film, a polyphenylene sulfide (PPS) film, a polypropylene (PP) film, and a fluororesin film such as a polytetrafluoroethylene (PTFE) can be exemplified as the base material.

The magnetic core 110 shown in FIG. 3 includes a plurality of soft magnetic ribbons for a magnetic core, but one soft magnetic ribbon for a magnetic core may be employed.

When the magnetic core of the present invention has a plurality of soft magnetic ribbons for a magnetic core, it is most effective when all of them are the soft magnetic ribbons for a magnetic core of the present invention. When one soft magnetic ribbon for a magnetic core of the present invention is provided in the plurality of soft magnetic ribbons for magnetic cores included in the magnetic core of the present invention, it is preferable that a soft magnetic ribbon for a magnetic core disposed on an outermost surface on which a coil is placed be the soft magnetic ribbon for a magnetic core of the present invention.

As a method of manufacturing the magnetic core of the present invention, a known method can be employed.

[Coil Unit]

Figure 4A:
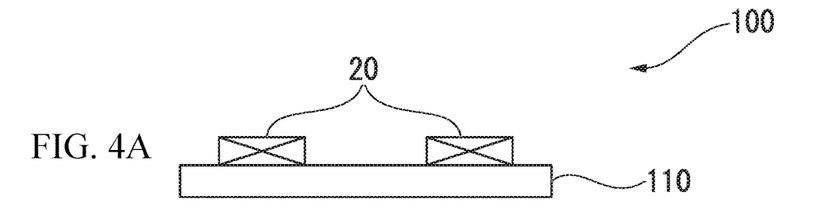
FIG. 4A is a schematic side view of a coil unit according to one embodiment of the present invention.
Figure 4B:
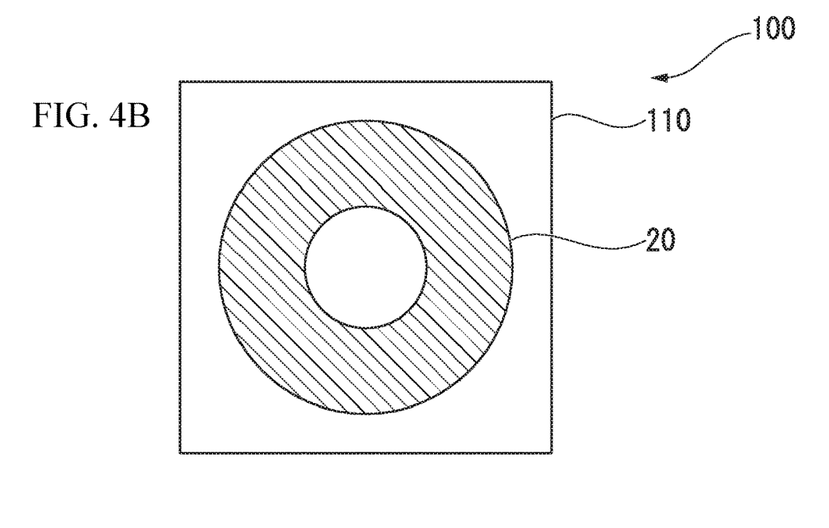
FIG. 4B is a plan view seen from a coil side.

FIG. 4A is a schematic side view of a coil unit according to one embodiment of the present invention, and FIG. 4B is a plan view of the coil unit viewed from the coil side.

The coil unit 100 shown in FIGS. 4A and 4B includes the magnetic core 110 of the present invention and a coil 20 disposed on the magnetic core 110. The coil 20 is disposed in the inductance priority region (coil disposed region) of the magnetic core 110.

The coil unit 100 shown in FIGS. 4A and 4B can be employed as both a power-receiving coil unit and a power-transmitting coil unit.

[Wireless Power Transmission Unit]

Figure 5:
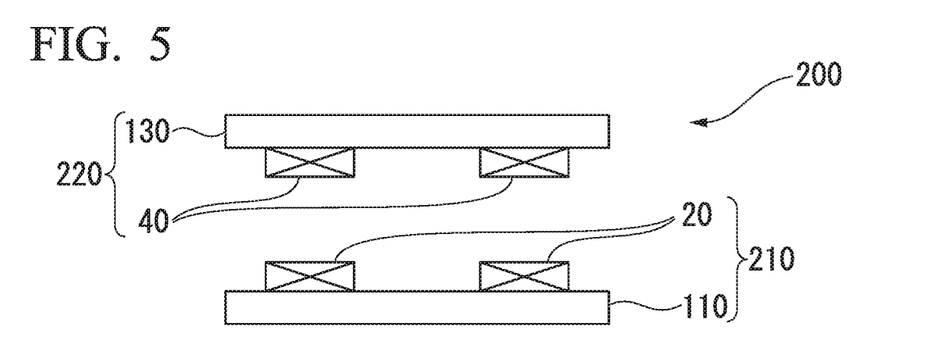
FIG. 5 is a schematic side view of a wireless power transmission unit according to one embodiment of the present invention in which a coil unit according to one embodiment of the present invention is used as a power-receiving coil unit and a power-transmitting coil unit.

FIG. 5 is a schematic side view of a wireless power transmission unit in which the coil unit according to one embodiment of the present invention is employed as a power-receiving coil unit and a power-transmitting coil unit, and only the power-receiving coil unit and the power-transmitting coil unit are shown in the figure among the wireless power transmission unit. A constituent element of the wireless power transmission unit additionally includes, for example, an amplifier unit having a power supply, inverter, and the like, a power-receiving unit having a rectifier and the like, a charging unit for charging the received electricity to a storage battery, or a direct current-direct current (DC-DC) converter for converting a voltage suitable for the device, and the like.

A wireless power transmission unit 200 shown in FIG. 5 includes: a power-transmitting coil unit 210 having the magnetic core 110 and the power transmission coil 20; and a power-receiving coil unit 220 having a magnetic core 130 and a power-receiving coil 40.

Figure 6:
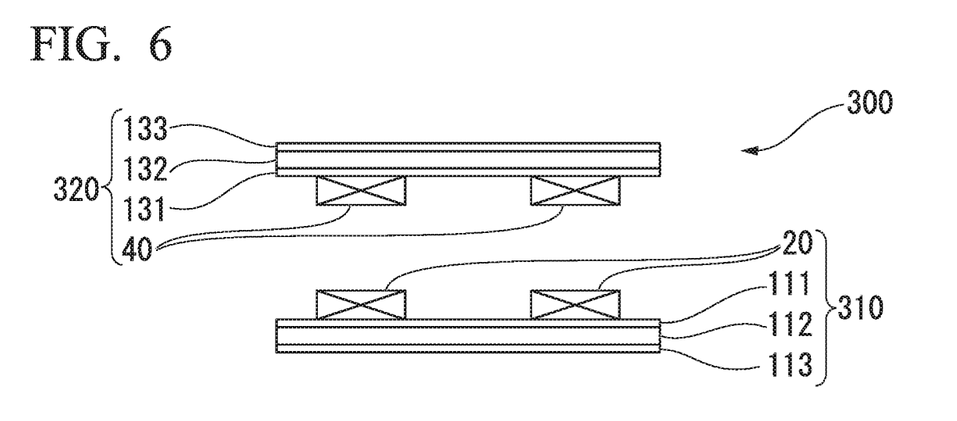
FIG. 6 is a schematic side view of a wireless power transmission unit according to another embodiment of the present invention in which a coil unit according to another embodiment of the present invention is used as a power-receiving coil unit and a power-transmitting coil unit.

FIG. 6 is a schematic side view of a wireless power transmission unit in which the coil unit according to another embodiment of the present invention is employed as a power-receiving coil unit and a power-transmitting coil unit, and only the power-receiving coil unit and the power-transmitting coil unit are shown in the figure among the wireless power transmission unit.

A wireless power transmission unit 300 shown in FIG. 6 includes: a power-transmitting coil unit 310 having a bobbin 111, a magnetic core 112, a metal shield 113, and the power transmission coil 20; and a power-receiving coil unit 320 having a bobbin 131, a magnetic core 132, a metal shield 133, and the power-receiving coil 40.

This embodiment is different from the embodiment shown in FIG. 5 in that the power-transmitting coil unit 310 includes a bobbin 111 and a metal shield 113, and similarly the power-receiving coil unit 320 includes a bobbin 131 and a metal shield 133.

Further, the bobbin is a resin component for neatly winding a coil, and the metal shield is a metal plate for shielding magnetic flux leakage so as not to affect peripheral devices or the like.

While embodiments of the present invention have been described above in detail with reference to the accompanying drawings, the respective configurations and combinations thereof in the respective embodiments are merely examples, and additions, omissions, substitutions, and other changes to the configurations are possible without departing from the spirit of the present invention.

EXAMPLES

Example 1

1. Manufacturing of Magnetic Core (1) First, an Fe-based nanocrystalline soft magnetic ribbon (soft magnetic ribbon made of an Fe-based nanocrystalline soft magnetic material) having a thickness of about 20 μm and previously heat-treated was bonded to one surface of a PET film having a thickness of 5 μm by applying an adhesive on both sides (5 μm including both the PET film and the adhesive), and a magnetic sheet (a configuration in which the Fe-based nanocrystalline soft magnetic ribbon was bonded to the PET film coated with an adhesive on its one surface as an adhesive layer) having a longitudinal and lateral size of 150 mm×150 mm was manufactured.

(2) Next, a segmented magnetic sheet was manufactured by subjecting to segmentation processing in which a segmented size was adjusted so that a portion not covered with a coil (eddy current suppression priority region) had an average crack interval of 0.07 mm and a portion covered with the coil (inductance priority region) had an average crack interval of 8 mm.

(3) Next, five pieces of segmented magnetic sheets manufactured in the same manner were laminated by disposing them so that the adhesive of the segmented magnetic sheet and the Fe-based nanocrystalline soft magnetic ribbon faced each other to bond to each other, and thereby a magnetic core was formed.

2. Evaluation (1) Coil Inductance

A circular planar spiral coil (inner diameter 50 mm, outer diameter 132 mm, thickness 1.8 mm) with 22 turns was placed on the obtained magnetic core, and inductance of the coil was measured using an LCR meter.

(2) Power Transmission Efficiency (Output Power/Input Power) η

Using a wireless power transmission device configured with a power-transmitting portion including a DC power supply, an amplifier unit, a resonance capacitor, and a power-transmitting coil unit, and a power-receiving portion including a power-receiving coil unit, a resonance capacitor, a rectifying and smoothing circuit, and an electronic load, the power-transmitting coil unit in which a ferrite plate having a thickness of 1.5 mm was used as the magnetic core thereof and the power-receiving coil unit in which the magnetic core of Example 1 was used as the magnetic core thereof were arranged to face each other so that a distance between the coils was 53 mm, and then power transmission efficiency η (100×(output power/input power)) when electric power of 250 W was received through wireless power transmission was measured.

The input power and output power were measured using a power meter (Yokogawa Electric WT210).

Example 2

A magnetic core of Example 2 was manufactured in the same manner as in Example 1 except that segmentation processing was performed for the Fe-based nanocrystalline soft magnetic ribbon to have an average crack interval of 0.16 mm at a portion not covered with a coil and an average crack interval of 8 mm at a portion covered with the coil.

Example 3

A magnetic core of Example 3 was manufactured in the same manner as in Example 1 except that segmentation processing was performed for the Fe-based nanocrystalline soft magnetic ribbon to have an average crack interval of 0.32 mm at a portion not covered with a coil and an average crack interval of 8 mm at a portion covered with the coil.

Example 4

A magnetic core of Example 4 was manufactured in the same manner as in Example 1 except that segmentation processing was performed for the Fe-based nanocrystalline soft magnetic ribbon to have an average crack interval of 8 mm at a portion not covered with a coil and an average crack interval of 0.16 mm at a portion covered with the coil.

Similarly in Examples 2 to 4, coil inductance and power transmission efficiency (output power/input power) were measured.

Example 5

A magnetic core of Example 5 was manufactured in the same manner as in Example 1. Measurements in the same manner as in Examples 2 to 4 were performed except that a tetragonal planar spiral coil (inner diameter 50 mm, outer diameter 130 mm, thickness 1.8 mm) with 22 turns was placed on the obtained magnetic core.

Comparative Example 1

A magnetic core of Comparative Example 1 was manufactured in the same manner as in Example 1 except that segmentation processing was performed so that an entire surface of the Fe-based nanocrystalline soft magnetic ribbon had an average crack interval of 0.07 mm.

Comparative Example 2

A magnetic core of Comparative Example 2 was manufactured in the same manner as in Example 1 except that segmentation processing was performed so that an entire surface of the Fe-based nanocrystalline soft magnetic ribbon had an average crack interval of 8 mm.

In Comparative Examples 1 and 2 as well, as in Example 1, coil inductance and power transmission efficiency (output power/input power) were measured.

Comparative Example 3

A magnetic core of Comparative Example 3 was manufactured in the same manner as in Comparative Example 1. Measurements in the same manner as in Comparative Example 1 were performed except that a tetragonal planar spiral coil (inner diameter 50 mm, outer diameter 130 mm, thickness 1.8 mm) with 22 turns was placed on the obtained magnetic core.

Comparative Example 4

A magnetic core of Comparative Example 4 was manufactured in the same manner as in Comparative Example 2. Measurements in the same manner as in Comparative Example 2 were performed except that a tetragonal planar spiral coil (inner diameter 50 mm, outer diameter 130 mm, thickness 1.8 mm) with 22 turns was placed on the obtained magnetic core.

Figure 7:
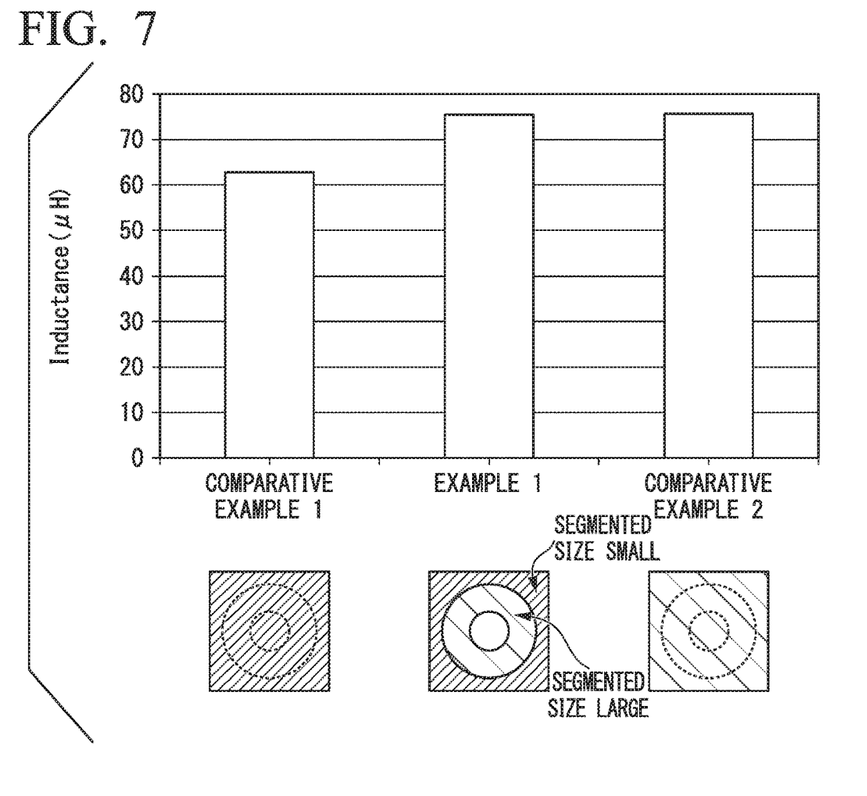
FIG. 7 is a graph showing magnitudes of inductance of Example 1, Comparative Example 1, and Comparative Example 2.

Measurement results of inductance in Example 1, Comparative Example 1 and Comparative Example 2 were compared in FIG. 7. Plan views shown below the graph illustrate respective power-receiving coil units. A donut shape shown by a dotted line shows a projected figure (coil disposed region) of the coil.

Figure 8:
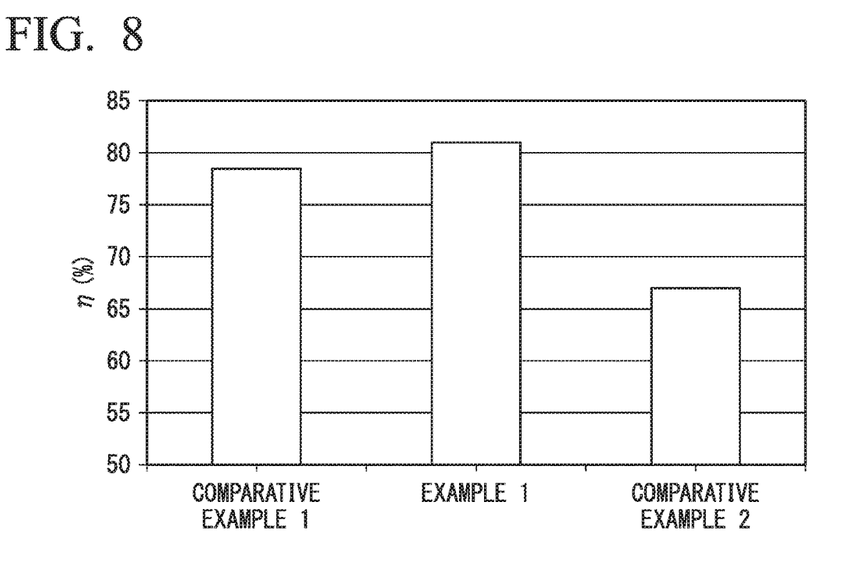
FIG. 8 is a graph showing magnitudes of power transmission efficiency of Example 1, Comparative Example 1, and Comparative Example 2.

FIG. 8 is a view showing measurement results of power transmission efficiency in Example 1, Comparative Example 1, and Comparative Example 2.

As shown in FIG. 7 and FIG. 8, in Example 1, power transmission efficiency higher than that of Comparative Example 1 and Comparative Example 2 could be obtained, while maintaining high coil inductance.

Measurement results of Examples 1 to 5 and Comparative Examples 1 to 4 are summarized in Table 1. In any case of Examples 1 to 5, high power transmission efficiency was obtained while maintaining high inductance with respect to those in Comparative Examples 1 to 4. In the case of Example 4 in which magnitudes of the average crack intervals between the two regions were reversed, although the inductance was slightly reduced, the same power transmission efficiency with similar extent in Examples 1 to 3 was obtained.

TABLE 1

| | | | Average crack interval | | | | |
|---|---|---|---|---|---|---|---|
| | Magnetic material | Coil shape | Inductance priority region (1) | Eddy current suppression priority region (2) | (1)/(2) | Inductance | Power transmission efficiency η |
| Example 1 | Fe-based nanocrystalline soft magnetic ribbon | Circular shape | 8 mm | 0.07 mm | 114 | 75 | 81 |
| Example 2 | Fe-based nanocrystalline soft magnetic ribbon | Circular shape | 8 mm | 0.16 mm | 50 | 75.2 | 80 |
| Example 3 | Fe-based nanocrystalline soft magnetic ribbon | Circular shape | 8 mm | 0.32 mm | 25 | 75.5 | 79.5 |
| Example 4 | Fe-based nanocrystalline soft magnetic ribbon | Circular shape | 0.16 mm | 8 mm | 0.02 | 65 | 78.7 |
| Example 5 | Fe-based nanocrystalline soft magnetic ribbon | Tetragonal shape | 8 mm | 0.07 mm | 114 | 90 | 80.5 |
| Comparative Example 1 | Fe-based nanocrystalline soft magnetic ribbon | Circular shape | 0.07 mm | | — | 63 | 78.3 |
| Comparative Example 2 | Fe-based nanocrystalline soft magnetic ribbon | Circular shape | | 8 mm | — | 76 | 67 |

TABLE 1-continued

| | Magnetic material | Coil shape | Average crack interval Inductance priority region (1) | Average crack interval Eddy current suppression priority region (2) | (1)/(2) | Inductance | Power transmission efficiency η |
|---|---|---|---|---|---|---|---|
| Comparative Example 3 | Fe-based nanocrystalline soft magnetic ribbon | Tetragonal shape | 0.07 mm | — | — | 75 | 77 |
| Comparative Example 4 | Fe-based nanocrystalline soft magnetic ribbon | Tetragonal shape | 8 mm | — | — | 90.8 | 66 |

Example 6

A magnetic sheet in which an Fe-based amorphous soft magnetic ribbon was bonded to one surface of a PET film was used. Also, segmentation processing was performed for the Fe-based amorphous soft magnetic ribbon to have an average crack interval of 0.18 mm at a portion not covered with a coil and an average crack interval of 10 mm at a portion covered with the coil. A magnetic core of Example 6 was manufactured in the same manner as in Example 1 for the other conditions.

Comparative Example 5

A magnetic sheet in which an Fe-based amorphous soft magnetic ribbon was bonded to one surface of a PET film was used. Also, a magnetic core of Comparative Example 5 was manufactured in the same manner as in Comparative Example 1 except that segmentation processing was performed so that an entire surface of the Fe-based amorphous soft magnetic ribbon had an average crack interval of 10 mm.

Comparative Example 6

A magnetic core of Comparative Example 6 was manufactured in the same manner as in Comparative Example 5 except that segmentation processing was performed so that an entire surface of the Fe-based amorphous soft magnetic ribbon had an average crack interval of 0.18 mm.

Measurement results of Example 6 and Comparative Examples 5 and 6 are summarized in Table 2. Even when types of magnetic material were changed, in Example 6, high power transmission efficiency was obtained while maintaining high inductance with respect to those in Comparative Examples 5 and 6.

TABLE 2

| | Magnetic material | Coil shape | Average crack interval Inductance priority region (1) | Average crack interval Eddy current suppression priority region (2) | (1)/(2) | Inductance | Power transmission efficiency η |
|---|---|---|---|---|---|---|---|
| Example 6 | Fe-based amorphous soft magnetic ribbon | Circular shape | 10 mm | 0.18 mm | 56 | 68 | 75 |
| Comparative Example 5 | Fe-based amorphous soft magnetic ribbon | Circular shape | 10 mm | — | — | 70 | 65 |
| Comparative Example 6 | Fe-based amorphous soft magnetic ribbon | Circular shape | 0.18 mm | — | — | 53 | 71.3 |

Example 7

Segmentation processing was performed so that a region having a third crack interval smaller than the second average crack interval was provided in the vicinity of the boundary between the coil disposed region (inductance priority region) and the coil non-disposed region (eddy current suppression priority region). Here, the third crack interval was 0.03 mm. A magnetic core of Example 7 was manufactured in the same manner as in Example 1 for the other conditions.

As in Example 1, coil inductance and power transmission efficiency (output power/input power) were measured. Measurement results of Example 7 are summarized in Table 3. When there was a portion having the third crack interval, high power transmission efficiency was obtained while maintaining the same high inductance as those in Examples 1 to 4.

TABLE 3

| | | Average crack interval | | | | |
|---|---|---|---|---|---|---|
| | Magnetic material | Inductance priority region (1) | Eddy current suppression priority region (2) | Third crack interval (3) | (2)/(3) | Inductance | Power transmission efficiency |
| Example 7 | Fe-based nanocrystalline soft magnetic ribbon | 8 mm | 0.07 mm | 0.03 mm | 0.4 | 74.8 | 81.5 |

INDUSTRIAL APPLICABILITY

According to the soft magnetic ribbon for a magnetic core of the present invention, reduction of eddy current loss and maintenance of high inductance can be achieved at the same time, and thus it is suitable for wireless power transmission technology.

EXPLANATION OF REFERENCES 1a, 1aa Inductance priority region (coil disposed region)
1b, 1bb Eddy current suppression priority region (coil non-disposed region)
2a to 2i Adhesive layer
3a, 3b Protective film
10, 10a to 10j, 10A Soft magnetic ribbon for magnetic core
110, 112, 130, 132 Magnetic core
20, 40 Coil
100 Coil unit
200, 300 Wireless power transmission unit
210, 310 Power-transmitting coil unit
220, 320 Power-receiving coil unit
M Laminate

What is claimed is:

1. A soft magnetic ribbon for a magnetic core, the soft magnetic ribbon comprising one surface perpendicular to a thickness direction of the soft magnetic ribbon, wherein
    the soft magnetic ribbon is made of a plurality of pieces made of a magnetic alloy,
    the plurality of pieces are physically segmented and each of the pieces is separated by cracks therebetween,
    the one surface is made of a first region, a second region and a third region,
    the first region has a circular or tetragonal shape,
    an inside and an outside of the first region are made of the second region and the third region,
    the third region is in the vicinity of a boundary between the first region and the second region,
    an average crack interval in the first region is 25 to 114 times larger than an average crack interval in the second region,
    an average crack interval in the third region is smaller than the average crack interval in the second region,
    the average crack interval in the first region being a length of a line drawn in the first region divided by a number of cracks intersecting the line in the first region,
    the average crack interval in the second region being a length of a line drawn in the second region divided by a number of cracks intersecting the line in the second region,
    the average crack interval in the third region being a length of a line drawn in the third region divided by a number of cracks intersecting the line in the third region, and
    the third region is a region which is an inner peripheral edge and an outer peripheral edge of the first region, and a width of the inner peripheral edge and the outer peripheral edge is 10% or less of an outer diameter of the first region.

2. A magnetic core comprising the soft magnetic ribbon for the magnetic core according to claim 1.

3. A coil unit comprising:
    the magnetic core according to claim 2; and
    a coil disposed on the magnetic core.

4. A wireless power transmission unit comprising the coil unit according to claim 3.

5. The soft magnetic ribbon for a magnetic core according to claim 1, wherein
    the first region is a region enclosed by a first circle and a second circle that are concentric circles, and the second circle has a smaller diameter than the first circle as viewed from the direction perpendicular to the one surface.

6. The soft magnetic ribbon for a magnetic core according to claim 1, wherein
    the first region is a region enclosed by a first rectangle and a second rectangle that have a common intersection point of two diagonals, and the second rectangle has a smaller diagonal than the first rectangle as viewed from the direction perpendicular to the one surface.

7. The soft magnetic ribbon for a magnetic core according to claim 1,
    wherein the first region is a coil-disposed region where a coil is disposed in plan view, and the second region with the third region is a coil non-disposed region where a coil is not disposed in plan view.

* * * * *